United States Patent [19]

Petersen

[11] 4,363,980
[45] Dec. 14, 1982

[54] LINEAR MOTOR

[75] Inventor: Christian C. Petersen, Westwood, Mass.

[73] Assignee: Polaroid Corporation, Cambridge, Mass.

[21] Appl. No.: 295,536

[22] Filed: Aug. 24, 1981

Related U.S. Application Data

[63] Continuation of Ser. No. 45,822, Jun. 5, 1979, abandoned.

[51] Int. Cl.³ .............................................. H02K 33/00
[52] U.S. Cl. .......................................... 310/15; 310/30
[58] Field of Search ....................... 310/14, 30, 15, 34, 310/35, 12, 13; 335/229, 230, 306

[56] References Cited

U.S. PATENT DOCUMENTS

| | | | |
|---|---|---|---|
| 3,022,400 | 2/1962 | von Ahlefeldt | 200/93 |
| 3,149,255 | 9/1964 | Trench | 310/30 |
| 3,202,886 | 8/1965 | Kramer | 317/171 |
| 3,495,147 | 12/1967 | Flora | 318/135 |
| 3,549,917 | 12/1970 | Espenschied et al. | 310/14 |
| 3,728,654 | 4/1973 | Tada | 335/234 |
| 3,755,699 | 8/1973 | Cartwright | 310/12 |
| 3,860,300 | 1/1975 | Lyman | 308/10 |
| 3,874,750 | 4/1975 | Greig | 308/10 |

FOREIGN PATENT DOCUMENTS 817381 8/1957 United Kingdom .

Primary Examiner—Donovan F. Duggan
Attorney, Agent, or Firm—Alfred E. Corrigan

[57] ABSTRACT

A linear motor which utilizes the magnetic attraction between a washer formed from a ferrous material, e.g., steel, and a magnetic pole of an armature for automatically returning the armature to its original position upon the deenergization of a field coil. The washer is originally located in alignment with and in surrounding relation to one of the effective poles of the armature. The stroke of the armature is limited to a distance which insures that at the end of the stroke the one effective pole will be located closer to the washer than any other effective pole. Upon deenergizing the field coil, the magnet attraction between the one effective pole and the washer will cause the armature to return to its original position.

16 Claims, 6 Drawing Figures

LINEAR MOTOR

RELATED APPLICATION

This application is a continuation of application Ser. No. 045,822, filed June 5, 1979 now abandoned.

This application is related to my application Ser. No. 045,830, entitled "Shutter Blade Drive System," filed on even date herewith, now U.S. Pat. No. 4,265,530.

BACKGROUND OF THE INVENTION

1. Field of the Invention

This invention relates to a linear motor.

2. Description of the Prior Art

Dynamoelectric motors are well known and generally include a bobbin about which is wound one or more field coils. Mounted within the bobbin is an armature which may be comprised of a core formed from a piece of soft iron, as shown in U.S. Pat. No. 3,728,654; or, it may be comprised of a plurality of permanent magnets, as shown in U.S. Pat. Nos. 3,022,400, 3,202,886 and 3,495,147; or the armature may be a combination of a core and a permanent magnet. The application of a direct current in one direction to the field coil generates a magnetic field which produces a force to drive the armature in a first direction until it is physically stopped and the reverse application of the direct current to the field coil will cause the armature to be driven in an opposite direction until it again hits a physical stop. One disadvantage of the motors described and shown in the above-identified patents is that each output shaft produces only one stroke for each energization and deenergization of its field coil. In other words, the armature does not return to its original position upon the deenergization of its field coil.

One of the problems with returning an armature to its original position is the precise positioning of the armature relative to the field coil thereby insuring that the length of each stroke is substantially the same. One proposed solution is offered in U.S. Pat. No. 3,549,917 wherein opposing springs are used to center or return an armature to its original position upon the deenergization of its field coil. Also, see U.S. Pat. No. 3,755,699 wherein flexible diaphragms are used to return a bobbin to its central position. However, the matching of the opposing springs or diaphragms to insure that they will always provide equal and opposite forces leaves much to be desired, both practically and economically.

U.S. Pat. No. 3,860,300 describes a control system including a plurality of permanent magnets made from samarium cobalt and a pair of electromagnets for repositioning a rotating shaft. The output of each electromagnet is controlled by a circuit containing a differential amplifier. See also U.S. Pat. No. 3,874,750 wherein a permanent magnet thrust bearing system is used to locate a rotatable shaft relative to a fixed number. However, neither of these systems is related to an environment wherein a field coil is energized to move an armature axially in order to provide an output for driving a member and, when deenergized, is automatically returned to its original position.

SUMMARY OF THE INVENTION

The instant invention relates to a dynamoelectric motor and, more particularly, to a linear motor. In a preferred embodiment of the invention, the linear motor includes a generally cylindrically shaped bobbin for supporting between its cheeks electrically conductive means in the form of a pair of field coils. The bobbin includes a cylindrically shaped passageway extending axially of the bobbin for reciprocally receiving a correspondingly shaped armature. The armature preferably includes a core formed from a magnetically permeable material such as steel. The armature is completed by a pair of permanent magnets, preferably formed from a rare earth material such as samarium cobalt. The magnets are fixedly secured to each axial end of the core such that common poles of the magnets are in engagement with the ends of the core and the other common poles define the opposite ends of the armature. Means in the form of a pair of end caps are secured to opposite ends of the bobbin for limiting the length of the stroke of the armature. Each end cap has a centrally located aperture which is dimensioned to permit the passage therethrough of a portion of an output rod which extends axially outwardly from each end of the armature. The end of each output rod which is secured to the armature is of a diameter which is larger than the diameter of the aperture and of the remainder of the rod whereby each end cap functions to limit the movement of the armature along the passageway.

A pair of field coils are wound upon the bobbin in side-by-side relation such that when they are not in an energized condition they are symmetrically located relative to the steel core. A pair of washers are fixedly secured to each end of the bobbin by the end caps such that they substantially encompass and are in alignment with the poles at the opposite ends of the armature when the coils are not energized. Each washer is preferably formed from a magnetically permeable material such as steel.

The common poles of the permanent magnets are secured to the axial ends of the steel core in order to provide a zone of maximum magnetic flux density which extends radially outwardly from the central portion of the steel core thereby creating an armature which in effect has three poles, i.e., two common poles, one at each end of the armature, and one pole of opposite polarity located equidistant the ends of the core. These poles will hereinafter be referred to as the effective poles of the armature.

The first of the two field coils upon being energized by a direct current, is adapted to produce a magnetic field whose force moves the armature from a first position, wherein the steel washers are located in alignment with the effective common end poles of the armature, to a second position whereat movement of the armature is stopped by the enlarged portion of one of the output rods moving into engagement with one of the end caps. This movement or stroke of the armature has a length which is less than one-half the distance between the north and south poles of the magnet which is located on the end of the armature closest to the second position, thereby insuring that the end pole of the magnet located closest to the second position is still located closer to its originally aligned steel washer than the opposite pole of the magnet is. When the flow of current to the first field coil is stopped, the magnetic attraction between the end pole located closest to the second position and its respective steel washer is strong enough to return the armature to the first position wherein the effective end poles are again located in alignment with their respective steel washers. The second field coil, when energized by a direct current, is adapted to move the armature from the first position to a third position, generally opposite to that of the second position, wherein the other effective end pole of the armature and its respective steel washer cooperate in a manner similar to that described with reference to movement of the armature into the second position to automatically return the armature to the first position upon deenergizing the second field coil.

In an alternative embodiment of the invention, the two steel washers are replaced by a single steel washer located substantially within the plane of maximum magnetic flux density. In this combination, when the armature has been moved into either the second or third position the effective non-common pole of the armature is located closer to the steel washer than either of the two effective common poles of the magnet thereby enabling the greater magnetic attraction therebetween to return the armature to its first position upon deenergizing the field coil.

In another alternative embodiment, the linear motor is comprised of a bobbin for supporting a single field coil, a single steel washer mounted on one end of the bobbin, one end cap, an armature comprised of a single permanent magnet having opposite effective poles, and an output rod having one of its ends secured to one of the effective poles of the permanent magnet. The steel washer is located in alignment with one of the effective poles of the armature when the armature (magnet) is in the first position. The armature is moved to the second position in response to the field coil being energized. So positioned, the effective pole of the armature which was previously located in alignment with the steel washer is still located closer to the steel washer than the other effective pole is. Accordingly, when the field coil is deenergized, the greater magnetic attraction between the previously aligned washer and effective pole is strong enough to return the armature to the first position.

An object of the invention is to provide a linear motor with improved means for returning an armature to its original position upon deenergizing a field coil.

Another object of the invention is to magnetically center an armature upon the deenergization of its field coil.

Still another object of the invention is to utilize the magnetic attraction between a magnetically permeable material and a permanent magnet to return an armature to its original position upon disconnecting a field coil from a source of direct current.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
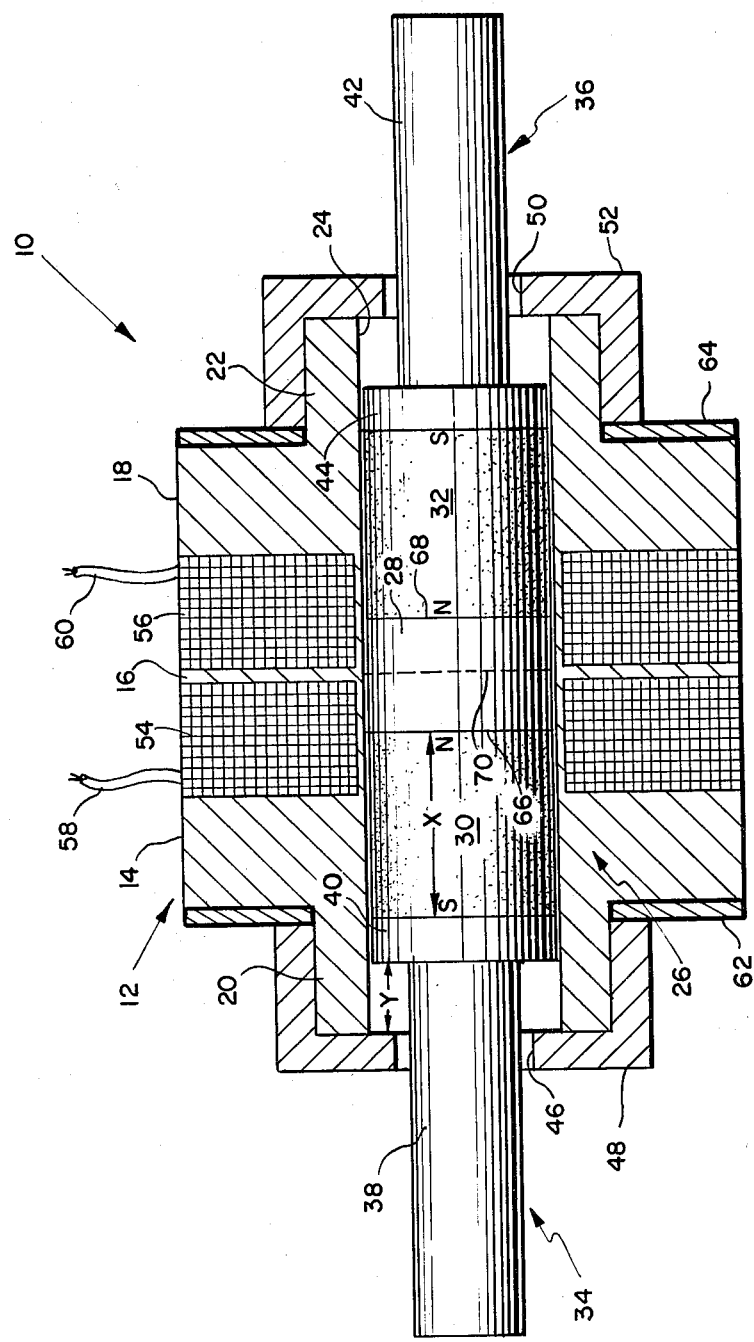
* FIG. 1 is an enlarged elevated view, partly in cross-section, of a preferred embodiment of a linear motor in a non-energized condition.
Figure 2:
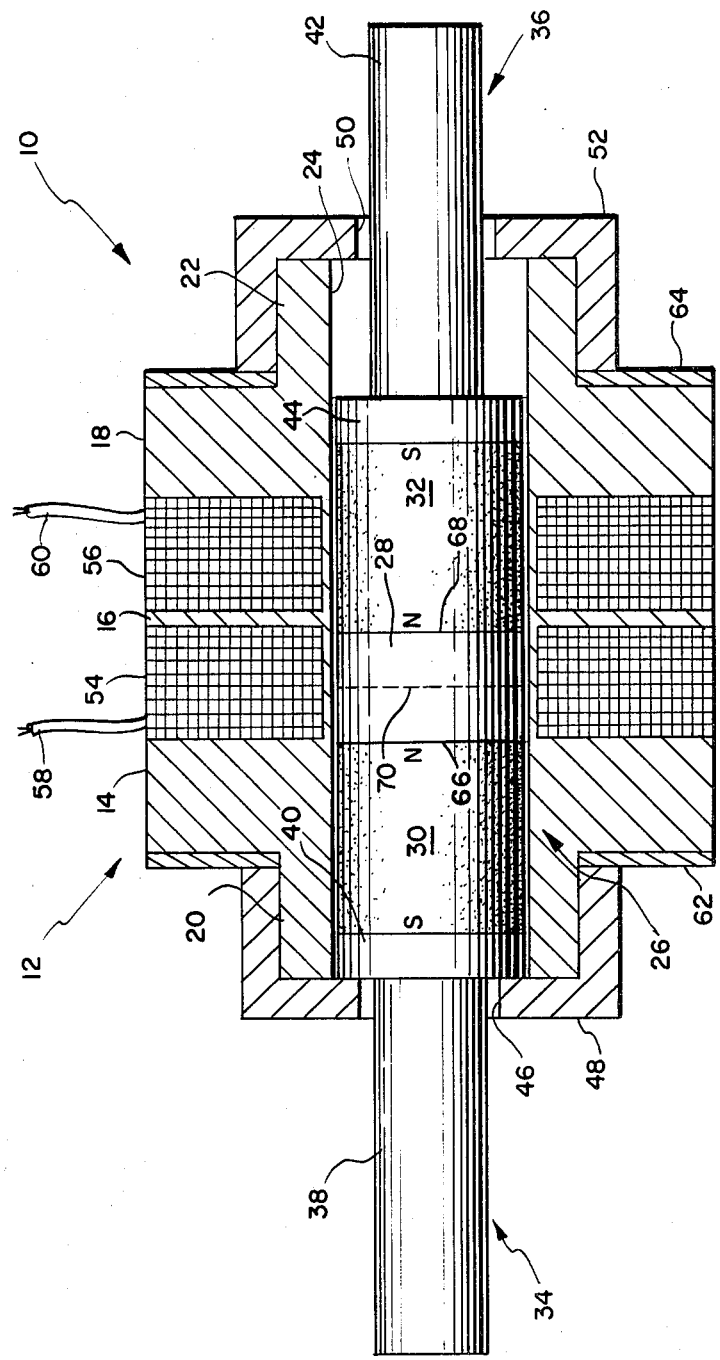
FIG. 2 is a view of the linear motor of FIG. 1 showing the position of its armature when one of its field coils is energized.

Reference is now made to FIGS. 1 and 2 of drawings wherein is shown a preferred embodiment of a linear motor 10, the motor's exterior housing being omitted for reasons of clarity. The motor 10 includes a generally cylindrically shaped bobbin 12, which is preferably of a non-conducting material such as Delrin, a thermoplastic resin sold by E. I. duPont de Nemours & Co. The bobbin 12 includes a plurality of annular cheeks 14, 16 and 18, end sections 20 and 22, and a longitudinally extending cylindrical passageway 24.

Mounted within the passageway 24 for reciprocating movement is an armature 26. The armature 26 includes a core 28, preferably formed from steel, and two permanent magnets 30 and 32, preferably formed from a rare earth material such as samarium cobalt. Each of the magnets 30 and 32 has a common pole such as its north pole N fixedly secured to an end face of the steel core 28 such that the south poles S of the magnets define the opposite ends of the armature 26.

A pair of output rods 34 and 36, preferably formed from Delrin, are fixedly secured to opposite ends of the armature 26. The output rod 34 includes an elongate cylindrical arm 38 and a head portion 40 of a diameter greater than that of the arm 38. The output rod 36 includes a similar arm and head portion 42 and 44, respectively. The arm 38 is adapted to pass through an opening 46 in an end cap 48 while the arm 42 is adapted to pass through an opening 50 in an end cap 52. Each of the end caps 48 and 52 is preferably formed from a thermoplastic material such as Delrin.

A pair of field coils 54 and 56 are mounted in side-by-side relation on the bobbin 12 such that the field coil 54 is located between the cheeks 14 and 16 and the field coil 56 is located between the cheeks 16 and 18. Each of the coils 54 and 56 is provided with an electrical cord 58 and 60, respectively, for connecting its associated field coil to a source of direct current. Each of the cords includes a pair of wires for completing a circuit through the coil.

A pair of washers 62 and 64, preferably formed from a magnetically permeable material such as soft steel, are provided for automatically moving the armature 26 from the position shown in FIG. 2 to the position shown in FIG. 1 upon deenergizing the field coil 54. The washer 62 is mounted on the end section 20 so as to encompass and be in alignment with the left effective south pole of the armature 26 and is secured thereon by the end cap 48. The washer 64 is similarly mounted on the end section 22 so as to encompass and be in alignment with the right effective south pole of the armature and is secured thereon by the end cap 52.

Figure 6:
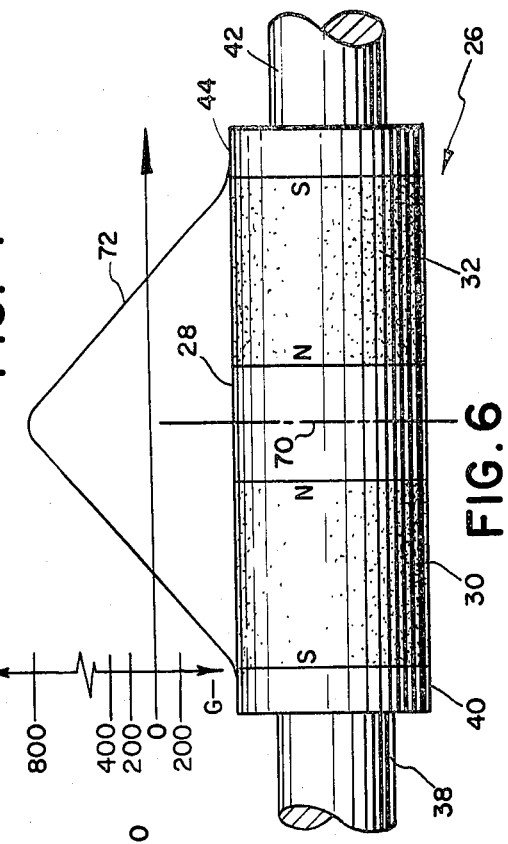
FIG. 6 is a diagrammatic showing of the relationship between an armature of the instant invention and a curve which represents the magnetic flux density of the armature.

As mentioned hereinabove, the north poles of the magnets 30 and 32 are fixedly secured to the axial end faces 66 and 68 of the steel core 28 in order to provide a zone of maximum magnetic flux density which extends radially outwardly from the central portion of the steel core 28 thereby creating an armature which in effect has three poles, i.e., two south poles designated S in the drawings and a single north pole designated by the broken line 70. This is graphically illustrated in FIG. 6 by the curve 72 which represents the radial flux density of the armature 26 as measured along its axis. It will be noted that the maximum flux density is in line with the effective north pole 70 while the flux density of the magnets 30 and 32 reverses at a point equidistant the south and north poles of each magnet.

In one example of a linear motor built according to the instant invention, each of the magnets 30 and 32 has a length and a diameter of 3.175 mm (0.125 inches), the steel core has a length of 1.905 mm (0.075 inch) and a diameter of 3.175 mm, the passageway 24 has a diameter of 3.2512 mm (0.128 inches) and a length of 12.192 mm (0.480 inches), and the bobbin 12 has a maximum diameter of 9.525 mm (0.375 inches) and a minimum diameter of 3.5052 mm (0.138 inches) at the location where the field coils 54 and 56 are wrapped around the bobbin 12. This combination provides for a maximum gauss of approximately 800 at the effective north pole of the armature 26, as represented by the broken line 70.

In its deenergized state, the armature 26 of the linear motor 10 assumes the position shown in FIG. 1. The armature 26 is moved from the position shown in FIG. 1, hereinafter referred to as the first position, to a second position, shown in FIG. 2, by connecting the field coil 54 to a source of direct current. Thus, the armature moves through a distance Y before its left hand effective south pole moves into engagement with the interior surface of the end cap 48. In the example linear motor described above, this distance Y is equal to approximately 1.2065 mm (0.0475 inches). So positioned, the effective south pole on the left hand side of the armature 26 is still located closer to the steel washer 62 than the north pole N of the magnet 30. This is always true because the distance Y is less than one-half of X, where X is the distance between adjacent poles of the magnet 30. Accordingly, when the current to the field coil 54 is terminated, the greater magnetic attraction between the effective south pole on the left side of the armature 26 and its associated steel washer 62 provides a force to return the armature 26 to its first position. This force is supplemented by the magnetic attraction that exists between the other effective south pole of the armature 26 and its associated steel washer 64. In the example motor set forth above, each washer preferably has an O.D. of 9.525 mm (0.375 inches), an I.D. of 5.08 mm (0.200 inches) and a thickness of 0.254 mm (0.010 inch). The magnetic attraction between each washer and its associated effective pole can be increased or decreased by decreasing or increasing, respectively, the diameter of the hole in each washer.

The armature 26 may be moved to the right, i.e., to a third position, by connecting the field coil 56 to a source of direct current. So energized, the head portion 44 of the output rod 36 moves into engagement with the interior surface of the end cap 52 after having traveled through a distance Y. As soon as the field coil 56 is deenergized, the greater magnetic force that exists between the effective south pole of the armature 26 and its associated washer 64, as compared to that which exists between the effective north pole N of the magnet 32 and the washer 64, moves the armature 26 back into its original or first position.

Figure 3:
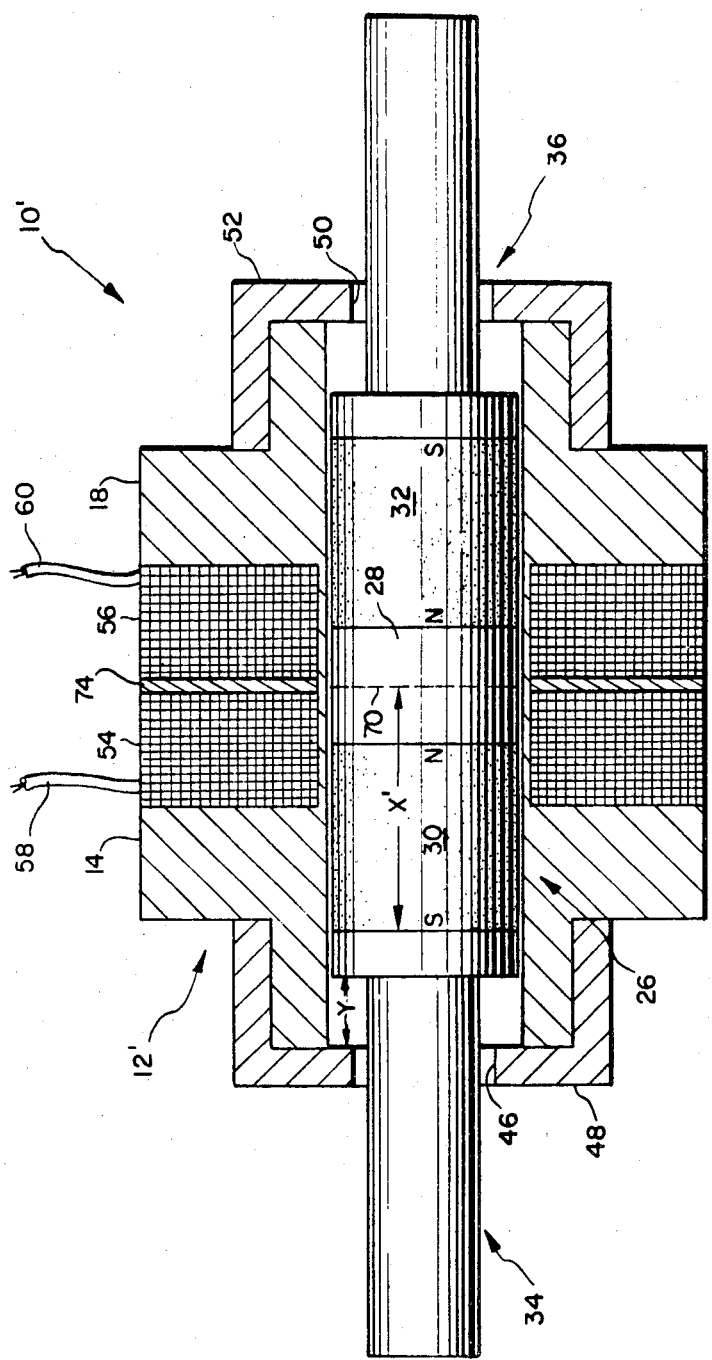
FIG. 3 is an enlarged elevational view, partly in cross-section, of an alternative embodiment of a linear motor, shown in its non-energized condition.
Figure 4:
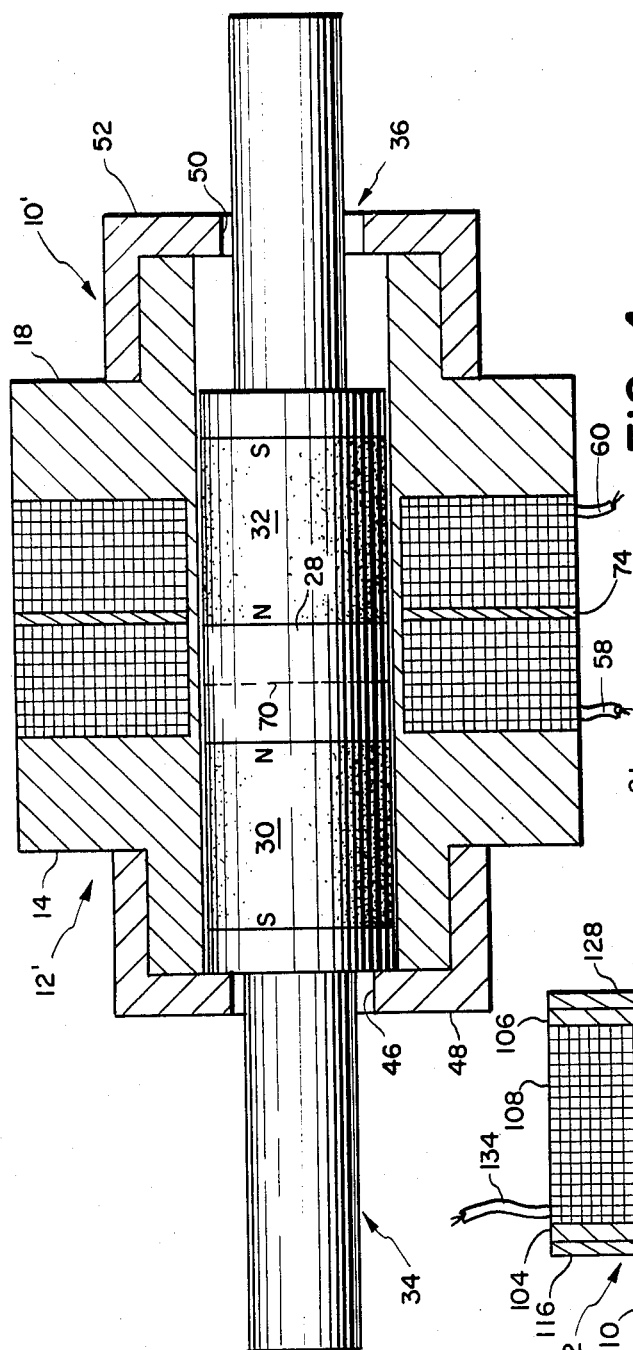
FIG. 4 is an elevational view of the linear motor of FIG. 3 in an energized condition.

Reference is now made to FIGS. 3 and 4 of the drawings wherein is shown an alternative embodiment of a linear motor 10'. The linear motor 10' is substantially identical to the linear motor shown in FIGS. 1 and 2 with one major change, i.e., the two steel washers 62 and 64 have been replaced by a single steel washer 74 which is located on the bobbin 12' in the position previously occupied by the cheek 16.

The operation of the linear motor 10' is substantially identical to that of the motor 10 except that in this embodiment it is the greater magnetic force acting between the effective north pole and the single steel washer 74 which moves the armature 26 from either of the second or third positions back into the first position. For example, energization of the field coil 54 by a direct current results in the armature 26 moving to the left, through a distance Y, into the second position wherein the effective south pole on the left of the armature 26 is in engagement with the interior surface of the end cap 48, as shown in FIG. 4. However, the effective north pole 70 is still located closer to the steel washer 74 than either of the effective south poles of the armature because Y is less than one-half of X' where X' is the distance between two effective poles. Accordingly, when the field coil 54 is deenergized, the greater magnetic attraction between the effective north pole 70 and the washer 74 provides the force necessary to return the armature 26 to its centrally located or first position. Energization of the field coil 56 results in the armature 26 moving to the right into its third position.

Figure 5:
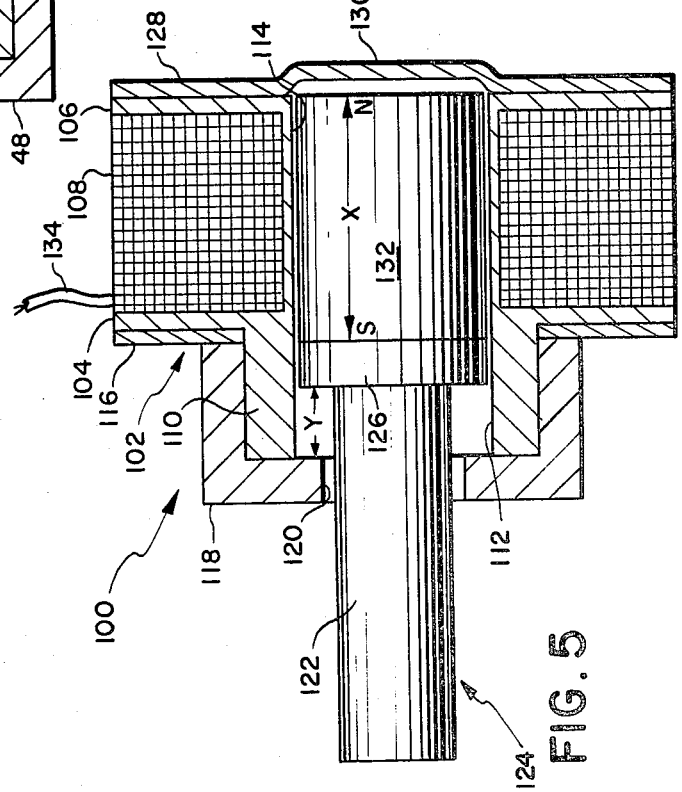
FIG. 5 is an enlarged elevational view, partly in cross-section of another embodiment of the instant invention.

Reference is now made to FIG. 5 of the drawings wherein is shown still another embodiment of a linear motor 100, the motor being shown in a first or deenergized position. The motor 100 includes a cylindrically shaped bobbin 102 having a pair of annular cheeks 104 and 106 between which is wound a field coil 108. Extending from one side of the cheek 104 is a cylindrically shaped end section 110 having an aperture 112 therein which forms a continuation of a cylindrically shaped passageway 114. A washer 116, made from a magnetically permeable material such as soft steel, is mounted on the end section 110 and retained in place thereon by an end cap 118. The end cap 118 has an aperture 120 for permitting the passage of a portion of a cylindrical shaft portion 122 of an output arm 124. The output arm 124 includes a head 126 having a diameter greater than that of the aperture 120 and slightly less than that of the aperture 112 and the passageway 114. The open end of the passageway 114 is closed off by a plate 128 having a recessed portion 130. The recessed portion 130 is spaced sufficiently from the end of the motor's armature to prevent engagement therebetween when the latter is returned to the position shown in FIG. 5, hereinafter referred to as the first position. The bobbin 102, the end cap 118, the plate 128 and the output arm 124 are preferably formed from Delrin.

A cylindrically shaped armature 132 is slidably received within the aperture 112 and the passageway 114. The armature 132 consists of a permanent magnet, preferably formed from samarium cobalt, having its effective north (N) and south (S) poles aligned axially of the passageway 114. The effective south pole S of the armature is fixedly secured by any suitable means to the head 126 of the output arm 124. When the armature 132 is in its original or first position, as shown in FIG. 5, the steel washer 116 is located in surrounding relation to and in alignment with the effective south pole S of the armature 132.

The field coil 108 is energized by connecting an electrical cord 134 to a source of direct current. So energized, a magnet field is produced which provides a force for driving the armature 132 to the left (as viewed in FIG. 5) through a distance Y (which is less than one-half of X) where it is stopped in its second position by the interior surface of the end cap 118. When the armature 132 is located in its second position, the effective south pole S is still located closer to the steel washer 116 than is the effective north pole N thereby having a greater magnetic attraction to the washer 116. When the field coil 108 is deenergized, this greater magnetic attraction between the effective south pole S and the washer 116 provides the force for automatically returning the armature 132 to its first position. The recessed portion 130 of the plate 128 allows the armature to momentarily overshoot its first position without causing any potential damage to the armature 132. While the armature 132 has been shown with its effective south pole being aligned with the washer 116 it should be understood that the poles could be reversed, as in all the previous double magnet motors.

Since certain changes may be made in the above apparatus without departing from the scope of the invention herein involved, it is intended that all matter contained in the above description or shown in the accompanying drawings shall be interpreted as illustrative and not in a limiting sense. For example, it is within the scope of the invention to replace the two field coils in the embodiments shown in FIGS. 1-4 with a single field coil, and the direction of movement of the armature from the first position to the second position would be in response to the direct current flowing through the field coil in one direction while reversing the flow of direct current would move the armature from the first position to the third position.

What is claimed is:

1. A linear motor comprising:
    means formed from a non-magnetic material for supporting electrically conductive means, said supporting means including means defining a passageway extending axially of said supporting means;
    an armature mounted within said passageway for axial movement relative to said supporting means between first and second positions, said armature including a pair of permanent magnets and a core, said core being located between said first and second permanent magnets with common poles of said magnets in engagement with opposite axial end faces of said core thereby forming an armature having effective common poles at the axial ends of said armature and an effective pole of opposite polarity located at a point substantially one-half the distance between the ends of said core;
    electrically conductive means wound upon said supporting means for moving said armature from said first position to said second position upon being electrically energized;
    output means mounted on one end of said armature for transmitting the movement of said armature to an apparatus to be driven thereby;
    means for limiting the movement of said armature along said passageway upon energization of said electrically conductive means; and
    means formed from a ferrous material mounted on said supporting means substantially in alignment with one of the effective poles of said armature when said armature is in said first position for automatically returning said armature to said first position upon deenergization of said electrically conductive means.

2. A linear motor as defined in claim 1 wherein said means formed from a ferrous material comprises a disc having an aperture therein through which a portion of said armature is adapted to pass.

3. A linear motor as defined in claim 2 wherein the distance traveled by said armature in moving from said first position to said second position is less than one-half the distance between the effective opposite poles of said armature.

4. A linear motor as defined in claim 2 wherein the distance traveled by said armature in moving from said first position to said second position is less than one-half the length between the magnetic poles of one of said permanent magnets.

5. A linear motor as defined in claim 4 wherein said limiting means is formed from a non-magnetic material.

6. A linear motor as defined in claim 4 further including second output means mounted on an end of said armature opposite to that at which said first-mentioned output means is mounted for transmitting the movement of said armature to an apparatus to be driven thereby.

7. A linear motor as defined in claim 6 wherein said electrically conductive means is energizable so as to move said armature from said first position to a third position, said third position being in a direction generally opposite to that taken by said armature in moving from said first position to said second position.

8. A linear motor as defined in claim 7 further including a second apertured disc formed from a ferrous material through which a portion of said armature is adapted to be moved as said armature moves between said first and third positions, said discs being mounted on said supporting structure in transverse relation to said armature and substantially in alignment with and in surrounding relation to opposite ends of said armature when said armature is in said first position for automatically moving said armature from said third position to said first position upon deenergization of said electrically conductive means.

9. A linear motor as defined in claim 8 wherein said electrically conductive means includes first and second field coils, said first field coil being energizable to move said armature from said first position to said second position and said second field coil being energizable to move said armature from said first position to said third position.

10. A linear motor as defined in claim 4 wherein said permanent magnets are formed from a rare earth material.

11. A linear motor as defined in claim 3 wherein said limiting means is formed from a non-magnetic material.

12. A linear motor as defined in claim 3 further including second output means mounted on an end of said armature opposite to that at which said first-mentioned output means is mounted for transmitting the movement of said armature to an apparatus to be driven thereby.

13. A linear motor as defined in claim 12 wherein said electrically conductive means is energizable so as to move said armature from said first position to a third position, said third position being in a direction generally opposite to that taken by said armature in moving from said first position to said second position.

14. A linear motor as defined in claim 13 wherein said an effective pole of said armature is a magnetic pole located substantially half way between the opposite ends of said core and said disc is located in alignment with said an effective pole when said armature is in said first position.

15. A linear motor as defined in claim 14 wherein said electrically conductive means includes first and second field coils, said first field coil being energizable to move said armature from said first position to said second position and said second field coil being energizable to move said armature from said first position to said third position.

16. A linear motor as defined in claim 1 wherein said permanent magnets are formed from a rare earth material.

* * * * *